March 28, 1961  R. P. HOLLAND, JR  2,976,952
ANTI-INGESTION MEANS FOR TURBOJET AIRCRAFT
Filed July 9, 1956  3 Sheets-Sheet 1

INVENTOR
Raymond P. Holland Jr.

March 28, 1961 R. P. HOLLAND, JR 2,976,952
ANTI-INGESTION MEANS FOR TURBOJET AIRCRAFT
Filed July 9, 1956 3 Sheets-Sheet 2

INVENTOR
Raymond P. Holland Jr.

March 28, 1961  R. P. HOLLAND, JR  2,976,952
ANTI-INGESTION MEANS FOR TURBOJET AIRCRAFT
Filed July 9, 1956  3 Sheets-Sheet 3

INVENTOR
Raymond P. Holland Jr.

United States Patent Office 2,976,952
Patented Mar. 28, 1961

2,976,952

ANTI-INGESTION MEANS FOR TURBOJET AIRCRAFT

Raymond Prunty Holland, Jr., 204 W. College Blvd., Roswell, N. Mex.

Filed July 9, 1956, Ser. No. 596,577

9 Claims. (Cl. 183—42)

This invention relates to means for preventing the ingestion of foreign objects into the air inlets of turbine engines on aircraft.

An object of this invention is to prevent vortex motion in the flow entering a fluid intake.

A specific object of this invention is to prevent foreign object ingestion due to vortex flow in the air approaching the inlet of an aircraft turbine engine on the ground.

It is an object of this invention to provide means for these purposes of utmost mechanical simplicity and practicability.

It is a further object of this invention to provide suitable nets, foreign object shelters and elimination devices to assure a high degree of freedom from foreign object ingestion from all sources.

It is a further object of this invention to increase the safety of operation of turbine-powered aircraft by preventing engine failures due to damage suffered from the ingestion of foreign objects.

It is another object of this invention to reduce the costs of operation of turbine engines, by preventing internal damage due to foreign object ingestion, and by rendering obsolete costly practices involving runway sweeping.

It is an object of this invention to eliminate many minor engine repairs now needed, to permit longer engine operating time between overhauls, and to reduce the number of spare engines which must be available per aircraft, thereby reducing both the ground crew costs and the costs of logistical support, by reducing the engine damage due to swallowing of foreign objects.

Other objects and advantages of the invention will be apparent from the following detailed description thereof, taken in connection with the drawings, wherein:

Figure 1 is a side elevation showing the relationships between a turbojet engine, its inlet cowling, the streamlines of a propulsive airstream being sucked into the cowling, the surface of the ground, and an intake vortex which is capable of projecting a foreign object into the intake airstream, which then blows it into the inlet.

Figure 2, taken at view A—A of Figure 1, shows the front view of an anti-vortex vane installed in the engine inlet.

Figure 6:
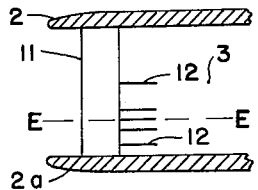
Figure 6 is a view taken on section C—C of Figure 3 showing multiple anti-vortex vanes in a serial multiplane arrangement, with the successive multiplane layers crossing each other, and with one multiplane layer lying closer to the inlet mouth than the other multiplane layer.
Figure 7:
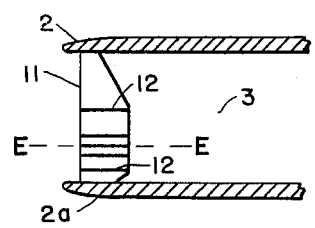

As an alternative to the arrangement shown in Figure 6, Figure 7 shows an arrangement of anti-vortex vanes which intersect each other in a cellular structure.

Figure 4:
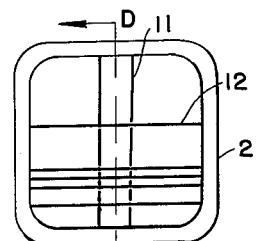
Figure 8:
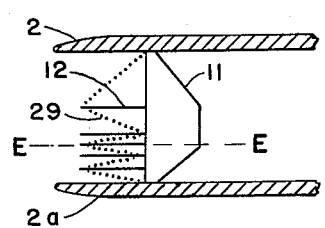

Figure 8 is a view on section D—D of Figure 4, showing a staggered arrangement of anti-vortex vanes, with the horizontal vanes lying upstream from the vertical vanes and also showing a pleated sloping resilient net.

Figure 9:
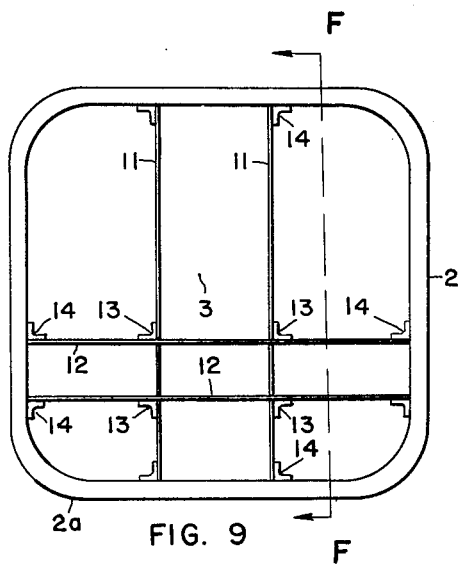

Figure 9 is a front view of an anti-vortex vane installation, showing details of attachment, such as might be employed for field rework of airplanes already in service.

Figure 11:
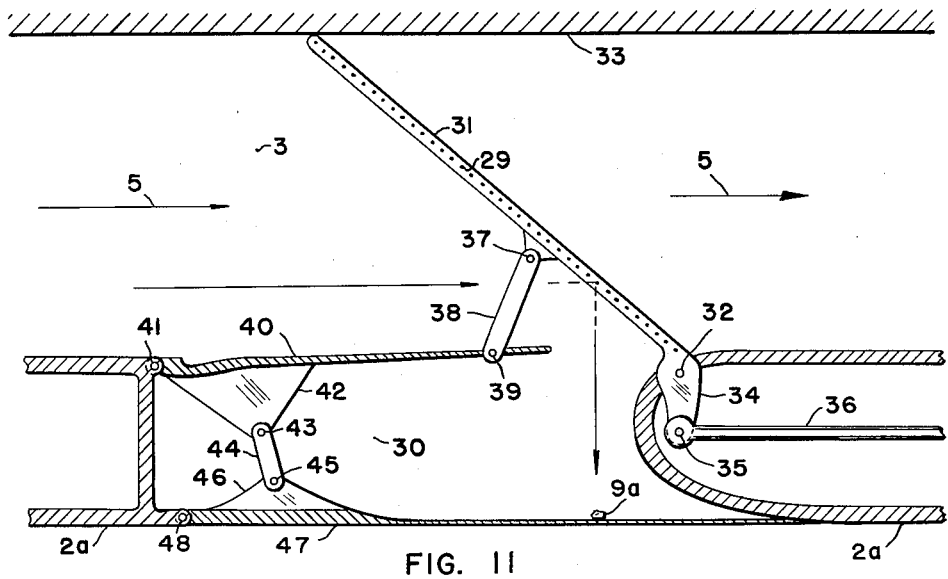

Figure 11 is a vertical cross section through the bottom wall of a turbojet engine intake duct showing a sloping net and a foreign object shelter adapted to retraction of the net, external disposal of foreign objects, and closure of the cavity of the foreign object shelter.

Figure 12:
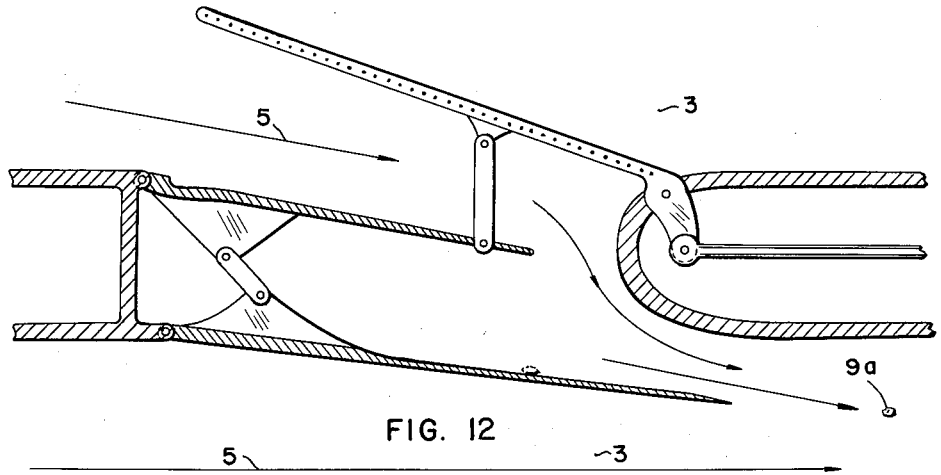

Figure 12 shows the net partially retracted, the flow from the duct temporarily passing through the foreign object shelter, the bottom of the duct temporarily open, and a foreign object escaping.

Figure 13:
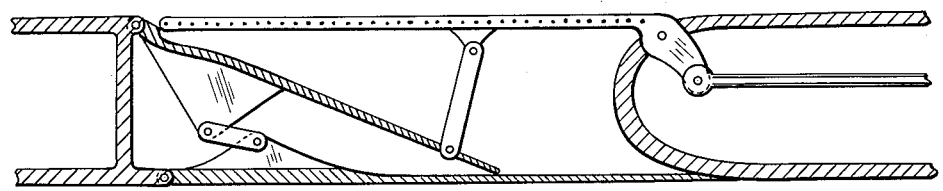

Figure 13 shows the net fully retracted, and the duct wall closed again, producing flush surfaces on both the internal and external walls of the duct.

Figure 14:
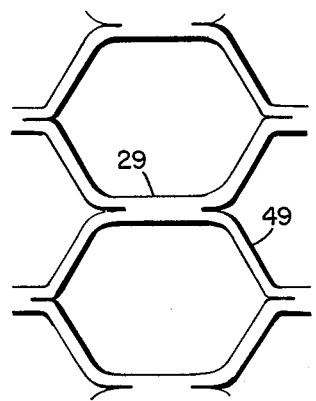

Figure 14 is an enlarged view normal to the plane of a resilient and deformable net.

In recent years the most frequent cause of overhaul of turbojet engines has been internal damage due to foreign objects. It has been the second greatest identifiable cause of failures in axial flow turbojet engines, accounting for approximately one-third of the aircraft accidents due to engine failures. It has accounted for approximately one-fifth of all minor repairs to turbojet engines between overhauls.

Devices employed to date to avoid these difficulties include machinery to remove foreign objects from runway surfaces and screens within the intake ducts to catch the objects. Specially designed runway cleaning trucks are costly to purchase and to operate. Runway surfaces are too large to keep clean under practical operating conditions, with the effects of weather and aircraft constantly putting new objects on the runways. The employment of any method for keeping runway surfaces free of all foreign objects of necessity interferes with the use of the runways for landing and taking off, and that use is becoming more intensive every year. No opportunity exists to clean runways often enough to assure freedom from foreign objects. Military jet aircraft operating under wartime conditions will preferably be dispersed for protection from nuclear weapons; it would be a major burden on economy and logistics to provide paved concrete runways and runway cleaning equipment and personnel at each such point of dispersal. Yet, even when operating from rough temporary landing strips, it is militarily essential to keep engines running at top performance, and to reduce the numbers of engines undergoing repair and overhaul. Runway cleaning trucks do not answer these needs.

Conventional screens in the intake ducts have numerous disadvantages. They cause a pressure drop in the intake air, appreciably reducing engine thrust when they are of sufficiently fine mesh to stop all objects which would harm the engine. They can be blocked quickly by ice, leading to compressor blade stall, surging, and power failure. If made retractible to clear the duct of all obstructions once airborne, they almost always have the fault of releasing into the engine some of the objects they have previously stopped. Large objects are not stopped by fine screens; they break through. Coarser screens do not stop small objects and are subject to fatigue failure themselves, in which case the broken parts pass into the engine.

This invention furnishes means for avoiding these faults of present devices, for greatly reducing the incidence of foreign objects at the duct inlet, and for preventing entry into the engine of those objects which enter the duct.

Several known actions by which objects may be raised from the ground are avoidable by ordinary diligence. Guards and fenders may be employed to block stones raised from the ground by landing gear wheels. The jet blast of another aircraft throws rocks, but this disturbance may be avoided by reasonable care by personnel, at distances to which rocks would be thrown. Mechanics may leave parts and small tools in engine inlets; training and the use of duct covers over engine inlets when engines are not running are indicated. By contrast, if a vortex forms at the inlet of a running engine its lower end will sooner or later find a small object on the ground and raise it into the intake airstream. If no vortex forms, the intake airstream of itself is not capable of raising objects of harmful size, as shown by tests and experience.

There is evidence that the major source of object ingestion is due to inlet vortices. Known causes of object ingestion do not account adequately for the known damage to engines. In warm dry climates where sand and small pebbles are plentiful no visible condensation of moisture occurs at the vortex core. The disappearance of a pebble or a small pocket of sand from the runway and its progress into an engine would not be observed in the half second needed for the operation, a half second which may occur at any time when the engine is running. When objects tossed lightly into the air by vortices right in front of the sucking engine inlet happen not to be drawn into the inlet, they leave no trace of the action, neither sound, scratch, nor dent. By contrast, pebbles thrown by the obvious action of the hot wind of a jet blast bombard the entire exposed form of an aircraft, having no preference for the region of the intake ducts and leaving dents and scratches as a record of each occurrence. The lack of such evidence would signify a corresponding lack of ingestion from this cause.

When there is little or no wind, an engine sucks air toward the engine inlet from all sides, the path of motion of each element of air describing streamlines running from surrounding space into the sucking inlet. There is a point or region on the surface of the ground, usually a small distance in front of the inlet, known as the stagnation point or stagnation region at the confluence of streamlines approaching along the ground from all directions. It marks the dividing point between streamlines at the surface approaching with horizontal components of motion from the front and those approaching with horizontal components of motion from the rear, and marking similarly the division of those approaching from the left and from the right. Similar points exist at all levels in the air, from the ground level up to the level of the intake. Air located along the line connecting these points, which I shall call the axial streamline, flows upward along the line into the engine, and is replaced by air from beneath and air converging toward this streamline from all sides. If the components of motion in the air moving inwardly normal to the axial streamline move directly toward that line, there will be no tendency for a vortex to form. If, however, the converging air contains circulation so that it does not move inward exactly to intersect with the axial streamline but all misses the line in the same clockwise sense so as to spin around the line, a tendency toward the formation of a vortex along the axial streamline is produced. The circulation which is necessary in this action is caused principally by the interaction of wind with the ground surface and other ground features, and is collected and localized by thermal currents rising through the atmosphere. The latter often exist in a form so strong as to produce well-defined vortices themselves.

Whether or not a vortex forms depends upon the circulation on the one hand, tending to produce it, and the internal friction in the air tending to prevent it. This friction is due either to viscosity or to turbulent mixing within the air. For example, the downwind wake of a building is turbulent and disorganizes the air and retards the formation of vortices. Once a vortex forms, local linear velocities within the rotating converging air increase very rapidly toward the core, producing relative shearing velocities within the air sufficient to produce large viscous shear forces near the axial streamline. These absorb the energy of rotation of the converging air, tending to retard the further growth of the vortex.

If the distance from the stagnation point on the ground to the engine inlet is short, friction has only a short length over which to act along the axial streamline, and all the circulation energy in the converging air is concentrated in this short distance, so that a vortex is likely to form. For these reasons, long vortices are less likely to form than short ones. Yet, if sufficient circulation is present very long and persistent vortices are possible, particularly with larger engines consuming air at greater rates causing the inertia influences in the air to predominate relatively over the internal friction effects, in other words, being at a higher Reynolds number.

Too much wind may carry the stagnation point too far downwind from the engine inlet, lengthen the axial streamline too greatly or produce too much turbulence, and may prevent the formation of the vortex. Too little wind may cause insufficient circulation to exist. The wind may come from any direction; a crosswind may cause the stagnation point to be located on the aircraft fuselage instead of on the ground. On the open airport the turbulence due to the wind is relatively small, the circulation is large due both to ground shear and thermal effects, and strong wind tends strongly toward vortex formation, especially when the aircraft is taxying downwind.

The internal detail of the vortex is the key to its control. At a normal cross section through the axial streamline of an idealized frictionless vortex the linear velocity of fluid flow around the center varies inversely as the distance from the center. The infinite velocities thereby implied cannot exist at the center of a real vortex; instead there is a region of relatively de-energized air, still whirling sufficiently fast to maintain an intensely localized region of low pressure at the center. This central suction area furnishes the intense pressure gradient toward the center which is required to force the moving air into a small radius turn around the center. It is a balanced system, with the air trying to continue in a straight line, but being compelled by the central low pressure to circle around that center. The core of any vortex must terminate at a surface or form into a ring, as in a smoke ring. These forms isolate the essential low pressure at the core from the higher pressures of the surrounding atmosphere. It is this same intense low pressure at the core which suddenly acts on the exposed upper surface of a pebble resting on the ground surface, and throws it into the air. The vortex is continuously trying to draw air toward its center, exactly as it draws the pebble off the ground but the air is a fluid and circulates in the balanced system just described so that it is whirled rather than being thrown and forms its own whirling barrier against any rapid inward motion.

To destroy a vortex, or to prevent the formation of a vortex, it is only necessary to retard sufficiently the circling motion of the air around its center at some point along the vortex axis. When vortices do not form naturally, friction is sufficient of itself to do this. Otherwise, mechanical assistance is needed. The simplest, smallest device capable of this assistance is a simple flat plate located in a position so that the axial streamline lies along its surface. Then the necessary spinning velocities around that streamline are forcibly prevented. At that point the fluid can no longer whirl; the low pressure at that portion of the axial streamline can no longer be maintained. The stopped air has a relatively high pressure. It is located adjacent to the vortex core, from which point it is drawn by the low pressure of the core lengthwise into the core, filling it with air at high pressure, reducing the sucking action, allowing the otherwise constrained circling air to continue in relatively straight lines outwardly, and thereupon the characteristically organized whirling structure of the vortex flies apart and dissipates its energy in a confusion of eddies.

The end of the axial streamline where it enters the cowling offers the most convenient point for the location of a device for its control. At this location a simple flat plate, as described above, may be located. Such plates or vanes located inside the engine inlet are capable of preventing the formation of a vortex if they have sufficient flow straightening capacity to remove from the flow that margin of circulation in excess of the amount at which a vortex would fail to form naturally.

The action of these anti-vortex vanes is very simple. As described above, a vortex cannot end in the open air but must anchor against a wall or pressure-tight surface of some sort. Whirling flow must extend all the way to the wall. But whirling flow cannot exist at the same time against a flat wall and also between parallel flat plates standing up normal to such a wall. The whirling flow stops at the plates, and the atmosphere is vented to the vortex core by flow between, under, and around the plates. The end of the vortex is exposed to the open air, which destroys its action. To repeat, in different words: When a flat surface is placed in the field of flow surrounding a vortex core with the plane of the surface parallel to the vortex core, the components of vortical velocity normal to the surface are locally reduced to zero. Deprived of its whirling mechanism by the interposition of flat plane surfaces, sharp pressure gradients can no longer be preserved in the vortex. The peculiar mechanism of the sucking vortex trunk is destroyed, its high velocity low pressure core is exposed to ambient pressure, and its ability to pick up pebbles from the airport surface is eliminated.

The above extended description of vortex action are necessary to the full understanding of this invention. They make clear that a vortex can be prevented by simple anti-vortex plates within the mouth of a duct. A scientific position has been held which specifies that nothing done to the air after it enters an inlet can influence a vortex in existence in the converging flow outside the inlet. This tenet precludes all progress in the matter of vortex prevention by any means located within the inlet duct of a turbojet aircraft, which is the most practical location on the aircraft for locating such means. This invention refutes that tenet and offers a construction of an elementary sort which bears out that refutation. In proof of the operation of this plane of the invention simple tests were performed which demonstrated the actions of sucking vortices described above. Fully formed vortices were quickly dissipated by the introduction of an anti-vortex vane at any point along the axial streamline. Anti-vortex vanes mounted within an inlet simulating an aircraft engine cowling were at least as effective in preventing or stopping vortex action as anti-vortex vanes mounted externally.

The understanding of this action explains the observation that a vortex is likely to pick a pebble out of a crack in the pavement in preference to one standing exposed on the pavement surface. The strongest runway vacuum cleaners have difficulty removing pebbles from cracks because the suction they produce is not concentrated at a point, and the wind they produced passes across the top of the crack in which the pebble is sheltered. For the same reason these cleaners are unable to pick up newly cracked flakes of concrete whereas a vortex lifts such flakes every time, because the total sucking force of its core acting on the flat top surface is always large. When a pebble is in a crack, the crack acts as a radial channel connecting the intense suction at the core of the vortex with the atmospheric pressure lying outside. When the vortex core touches the crack near the pebble an instantaneous blast of air travels lengthwise through the crack toward the center of the vortex, and from there into the sucking center, carrying the pebble with it. This is a temporary and fragmentary version of the same action produced by anti-vortex plates which if continued would destroy the vortex. Pebbles on a smooth flat surface are not so readily picked up because they must be touched more accurately by the vortex center. If this contact does not occur suddenly, there is a possibility that the winds circling the vortex center will roll the pebble away from the path of the center.

Airplanes taxying downwind preparatory to taking off furnish the quick contact and strong vortex needed to lift large exposed pebbles. Such aircraft move along with a mass of air often containing abundant circulation due to thermal vortices. There is only a small amount of relative motion between the airplane and the circulating air surrounding it, so that the conditions are ideal for a strong vortex to form between the inlet and the runway close under the inlet, even though the power output of the engine is small at that time. The intake vortex travels along with the moving mass of air containing the aircraft while the wandering lower end of this vortex scans several miles of runway surface, able to lift any pebble or sand which it encounters.

To obtain the necessary degree of vortex prevention with the least surface area, the vane area is located as closely as possible to the axial streamline. This streamline ordinarily enters the duct in a position beneath the central axis of the inlet stream, as a consequence of the position of the ground beneath the aircraft to which the axial streamline extends. In general, the axial streamline is relatively displaced from the duct axis toward the surface upon which it terminates, and the center of the anti-vortex vane area is correspondingly displaced. As the strength of the wind changes and moves the bottom end of the axial streamline, the position of the axial streamline within the duct is changed also, moving laterally with crosswind changes and vertically with changes in the wind component parallel to the flight direction. Increases in the rate of air consumption by the engine draws the bottom end of the axial streamline toward the inlet, with similar shifts in the position of the axial streamline within the duct. These movements are not large within the duct, however, and a single local vane of low aspect ratio suspended within the duct with its area concentrated as closely as possible to the mean position of the axial streamline is effective for vortex prevention. For reasons of practical installation such vanes would usually be made to span the duct. When it is not desirable for some reason to employ single vanes or when more vane area is needed, multiple surfaces may be used, having some portion of the vane area always very close to the axial streamline.

It is not only desirable to locate anti-vortex vane area close to the axial streamline; it is also desirable to preserve relatively open areas in the regions away from the axial streamline. These open areas, free of any surfaces which oppose rotation of the flow as it passes into the duct, are regions where the vortex core may move and maintain its whirling mechanism temporarily, but where the vortex cannot survive because of the distortion which would have to occur in the intake flow system and because of the extra energy which would be needed to maintain that distortion.

The form which is most effective for an anti-vortex vane is the thinnest rigid surface which it is possible to construct. The most effective spanwise form of the individual vane is the one which presents the least obstacle to spanwise pressure adjustments. Such vanes are free of crossvanes.

Being of such basic simplicity anti-vortex vanes may take a wide variety of forms in practice, some of which are shown in the drawings.

Short of extended experience it cannot be known whether anti-vortex vanes alone will sufficiently reduce the entry of foreign objects into engines to be able to dispense entirely with inlet screens. Meanwhile the use of anti-vortex vanes answers many of the problems of screening, by preventing a large number of object entries, and possibly eliminating entirely the entry of objects in certain ranges of sizes. For the problem of the occasional entry of a foreign object a net may be used instead of a screen. By "net" as compared to "screen" is meant an obstacle-snaring mesh which does not essentially require rigidity at any time, nor transportability within a rigid frame when not installed, and is lighter, with thinner wire, constructed to be resilient and to spring back when struck by a small object, and to deform in the manner of a fireman's net when struck by a large object. A permanent deformation due to the impact in such a net is of little consequence since it would happen seldom and the net could be replaced at periodic aircraft inspections at small cost. The ability to absorb kinetic energy through such deformation would enable screens having thin wires to stop heavy objects. Such nets are well suited only in the absence of repeated impacts, such as would be the case with anti-vortex vanes. Otherwise they would fail after their energy-absorbing stretch had been expended. The use of the thin wire made possible by these circumstances has the advantage of reducing the pressure drop through the mesh and rendering the mesh less liable to fatigue failure from vibration.

The preferred mounting of the thin-wire resilient net in the duct is in a slanting attitude. The slope has the advantages of reducing the pressure drop through a constant size mesh, of reducing the frontal projection of the interstices and thereby reducing the size of the smallest fast-moving dense object which will pass through interstices of a given size, and of producing a glancing blow.

By placing the sloping net in a position relatively forward at the top and rearward at the bottom, a foreign object is deflected downwardly into the lower wall of the duct. Foreign objects in the bottom of the duct, carried rearward by the airstream are prevented from obstructing the flow within the duct and are sheltered so as not to be continuously agitated and perhaps be moved into positions where they might escape through the net or wear their way through in time, by means of a cavity in the floor of the duct at the foot of the net. This cavity, local in extent and lying beneath the general low-drag streamlined smooth surface contour of the duct floor produces little or no pressure drop in the air streaming across it, and prevents the pressure drop which would otherwise occur if stopped foreign objects were exposed to the direct flow of air in the duct. The form of the cavity produces a sharply defined and clean separation in the flow between the main stream portion and the sheltered portion. In its downstream portions the surface contour of this sheltered area is rounded, convex toward the main stream, and blends back smoothly tangent to the contour level which the duct floor would have in the absence of the shelter pocket. In portions of this pocket a backwash flow exists holding foreign objects forward. In the re-entrant downstream portions a downstream flow exists; this portion may be conveniently screened over.

The complete elimination during flight of any pressure drop in the intake duct due to screens is desirable in certain classes of aircraft, in which event the net would be retracted once the aircraft is flying. A further advantage of retraction is the avoidance of atmospheric icing problems permitting the elimination of de-icing means on the nets. Once the retracting motion of the net provides a passage through which previously stopped foreign object might reach the engine, it becomes necessary to cover and hold the object, or expel it overboard. Holding is not so satisfactory as expulsion, since the temporary turbulence of the airstream within the duct during net retraction renders objects very difficult to hold. The answer to this problem is to divert the airstream overboard temporarily. Such expulsion is preferably accomplished in a manner in which the duct wall is airtight prior to expulsion, the opening of the wall is of very brief duration, and the wall is again airtight after expulsion. The momentary escape of ram air from the duct to the outside expels the foreign objects forcibly and assures that there can be no airflow through the object shelter at that instant which could possibly carry objects toward the engine.

Referring now specifically to the drawings, turbojet engine 1 installed in cowling 2 having a lower surface 2a and containing a longitudinal streamlined duct 3 for inlet air passing through cowling 2 to engine 1 stands on an airport in the presence of wind 4 which imparts circulation to the air entering the engine and which influences the positions of streamlines 5 marking the paths taken by the inlet air. Beneath the engine and its cowling is runway surface 6. Bending down to this surface and terminating on it is axial streamline 7, marking the boundary line which separates those streamlines 5a which approach the inlet from remote points lying low and in front of the aircraft from those streamlines 5b which approach the aircraft from remote points lying low and to the rear of the aircraft. Centered around axial streamline 7 lies vortex core 8 which exists whenever the inflowing air contains sufficient circulation to predominate over the vortex-opposing influences of turbulence in the air along streamlines 5a and 5b, and of viscosity shearing forces strongest near axial streamline 7. A greater rate of consumption of air engine 1 reduces the relative influences of these frictional and turbulence effects, and simultaneously draws the lower end of axial streamline 7 closer to the cowling inlet, both of which actions increase the tendencies toward vortex formation. Motion of the aircraft in the same direction as wind 4 similarly shortens axial streamline 7 and increases the tendency for a vortex core 8 to form. At the lower end of axial streamline 7 when vortex 8 is present foreign object 9 is encountered, for instance a piece of gravel. This is projected into the air by the concentrated low pressure at the core of vortex 8, not ordinarily following the path of the vortex core but often being thrown into a position to be caught in the high velocity flow represented by the converging streamlines 5, which transports it into passage 3 and on into engine 1 causing internal damage.

To prevent this action, single vane 10, of large chord is placed to span passage 3 in a position toward the ground from the central axis of the duct and with its plane substantially parallel to the central axis of the duct. The central axis of the duct is defined as the line joining the centers of gravity of successive lateral cross sections of the duct. Vane 10 is located at its midspan chord section along longitudinal line E—E which is the position of the most frequent location of axial streamline 7 under the pertinent design conditions, lying well beneath the central axis of the duct. In each of Figures 5, 6, 7 and 8 a horizontally situated anti-vortex vane (vane 10 in Figure 5 and one of the vanes 12 in Figures 6, 7, and 8) is shown lying tangent to line E—E. In Figures 6, 7, and 8 additional anti-vortex vanes 12 are shown, a portion of which lie above the line E—E and an equal portion of which lies below line E—E. Since line E—E always lies well beneath the central axis of the duct, as described, and since, as may be seen from the figures, no non-horizontal anti-vortex vane has its center of area higher than the central axis of the duct, it may be seen that the major portion of the sum of the areas of all vanes in the vane system always lies well below the axis of duct.

Figure 1:
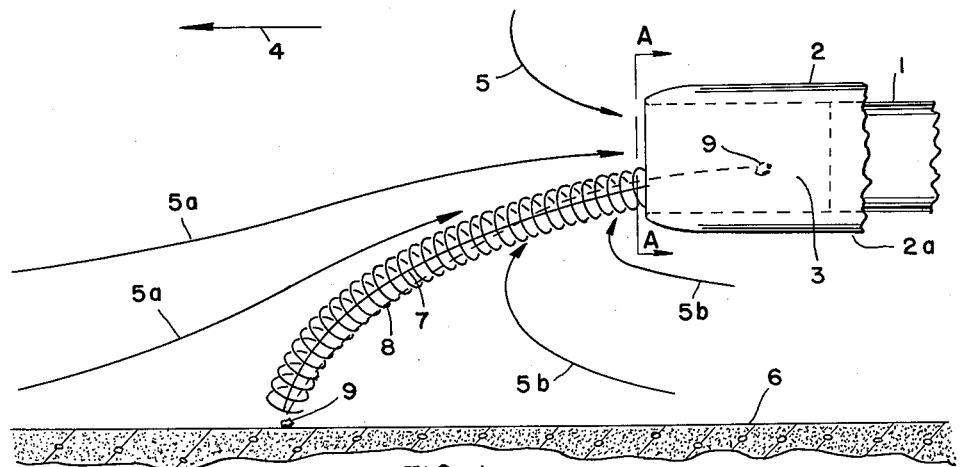
Figure 2:
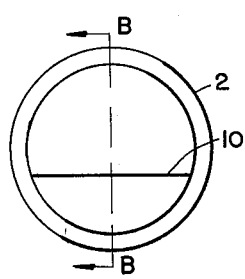
Figure 3:
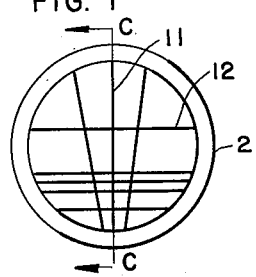
Figures 3 and 4 show front views of alternative arrangements of anti-vortex vanes installed in engine inlets.

For aircraft having engines mounted close to the level of the ground and having large volume high velocity air consumptions and therefore having a strong tendency toward vortex formation, or on which a single large vane is inconvenient for design reasons, multiple vanes are used. Either several vanes like vane 10 mounted parallel to each other, or crossed vanes are employed. Vane 11 with its plane approximately vertical crosses vane 12 to form such a system. Multiple vane systems of this sort are shown in Figures 3 and 4 in front view, and in Figures 6, 7, and 8 in median plane sectional side views. Vanes 11 may stand forward of vanes 12 as shown in Figure 6, or intersect with vanes 12 as shown in Figure 7, or stand behind vanes 12 as shown in Figure 8, or overlap vanes 12 to an intermediate degree (not shown). Non-intersecting crossed constructions as shown in Figures 6 and 8 place the center of area of a typical upstream cross vane appreciably closer to the duct mouth than the centers of area of the other vanes which it crosses, and have the aerodynamic advantage that each vane surface is uninterrupted across its span permitting pressure differences along the span to adjust themselves freely in a direction laterally to the flow, thereby obtaining the maximum available vortex-preventing action per unit of surface area.

In Figures 5, 6, 7 and 8 vanes 10 and 12 are shown in longitudinal cross section. The longitudinal cross sections of all vanes are straight lines lying parallel to the central longitudinal axis of the duct, as may be seen from Figures 2 through 10.

Figure 10:
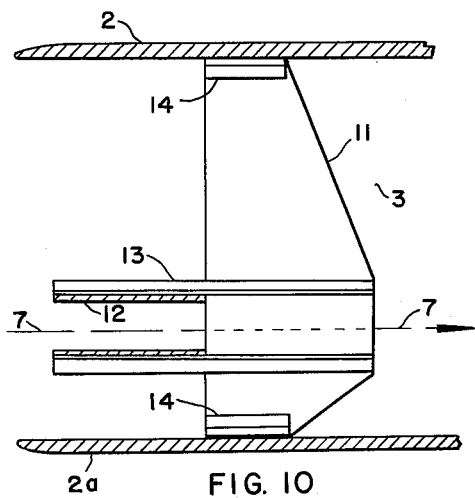

Anti-vortex vanes may be readily installed in service aircraft using hand tools alone. Figures 9 and 10 show the use of conventionally mounted angle stringers 13 and 14 to attach vanes 11 and 12 to each other and to the structure of cowling 2 respectively.

In installations of anti-vortex vanes like those shown in Figures 2 through 10 the use of very thin vanes of a minimum number adequate to prevent vortex formation is preferable for minimum flow blockage, for minimum total pressure loss through the duct, for minimum weight and complexity, and for the minimum total length and area of forwardly exposed leading edge. One aspect of this later consideration is the fact that atmospheric ice forming along the leading edges of such vanes cannot block an appreciable percentage of the duct cross sectional area, and heat de-icing provisions are not necessary.

Figure 5:
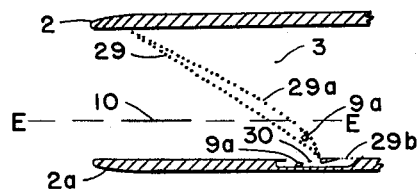
Figure 5 is a view taken on section B—B of Figure 2, showing the positions of a single anti-vortex vane, a sloping resilient net and a foreign object shelter.

Net 29 in Figure 5 is installed in duct 3 in a sloping position of small pressure drop and of high effectiveness for stopping small foreign objects. Net position 29a is caused by the impact a foreign object 9a originating from some source other than vortex action. The slope of the net causes object 9a to glance toward shelter cavity 30 beneath the streamlined lower surface contour of duct 3, within cowling 2a. A portion of cavity 30 lies forward of the bottom attachment point of net 29 in the duct wall, and a portion lies down-stream from that attachment point. Fine-meshed rigid screen 29b prevents the re-entry of object 9a into duct 3 through the downstream portion of shelter cavity 30. Screen 29b is used instead of an impervious surface at that point to permit rearward airflow through the rearward portion of cavity 30 to transport objects into that end of the pocket where they are securely retained. Other objects move forward in the backwash flow until under the lee of the forward wall of cavity 30. Although it is not shown in Figure 5, it is clear that the lower exterior surface of cowling 2a may be constructed conveniently in the form of a cowling door beneath shelter pocket 30 for the purpose of removing foreign objects manually.

In Figure 8 a pleated variety of net 29 is shown. De-icing of all non-retractible versions of net 29 is by conventional electrical resistance means not shown.

In Figure 11 a net is shown for use in combination with anti-vortex vanes such as those of Figures 3 and 6. Net 29 is mounted in frame 31 suitable for retraction, being pivoted at its lower downstream end around fixed pivot 32. In the actively screening position the upper forward end of frame 31 touches internal fairing body 33 within duct 3. Its retraction mechanism consists of lever 34 integral with frame 31, which lever 34 attaches at pivot 35 at the forward end of push-pull rod 36 which is actuated by conventional means not shown moving rearwardly in response to the same control action by the pilot which retracts the landing gear of the aircraft. Rearward motion of rod 36 causes a counterclockwise motion of frame 31 around pivot 32 which is affixed in the structure, moving link 38 substantially downward due to the motion of pivot 37 at its upper end where it attaches to frame 31. The lower end of link 38, pivoted at 39 carries plate 40 downward around pivot 41 at its forward end which is mounted in fixed structure. In the initial portion of the downward movement of plate 40, lever 42 on its lower surface, acting through link 44 pivoted at its ends at 43 and 45 respectivuely, and lever 46 on the upper surface of door 47, causes door 47 to open externally to the aircraft, moving downwardly pivoted around pivot 48, which is mounted to the rigid structure. As the downward motion of frame 31 continues, the linkage corresponding to succesesive pivots 41, 43, 45, and 48, no longer causes the distance between pivots 41 and 45 to increase, but causes that distance to decrease, and door 47 rotates upwardly until it is in its original closed and faired position forming a part of the external surface of the aircraft, and frame 31 lies flush with the contour of the floor of the duct. This action occurs very rapidly, as indicated by the short distance through which rod 36 travels to produce the action. Ample force on rod 36 is available by conventional means to produce this motion.

In Figure 11, the action of net 29 is shown as it stops foreign objects 9a and deflects it downwardly into sheltered cavity 30. Object 9a could also enter cavity 30 by arriving at the upper surface of plate 40 and being blown rearward over its free rearward edge. Link 38 obstructs such passage only locally. Figure 12 shows the partially retracted net position, the opening of the rear lower portion of cavity 30 corresponding thereto, the temporary diversion of streamline 5 through cavity 30, and the expulsion overboard of foreign object 9a. This action is strengthened by the climbing attitude of the aircraft immediately after take-off, which of itself enables object 9a to drop free. Figure 13 shows the retracted net position with cavity 30 covered by the net preventing entry into duct 3 of any foreign objects which by any chance were not expelled. The return of frame 31 to its active position upon extending the landing gear follows the above process in reverse and is similarly done quickly with a temporary blast of air downwardly and outwardly through cavity 30, in a direction to prevent movement of any residual foreign objects toward the engine.

Figure 14 shows in enlarged detail the resilient and deformable features of net 29. This net is constructed of thin high strength sheet material pierced and spread open to form a fine open-meshed honeycomb, having features which enable it to absorb impact. Between adjacent open hexagonal meshes thin tensile elements 49 of the net are bent in the shape of a flat "S" so that they may straighten and thereby lengthen in absorbing the impact of a foreign object. So long as it maintains its plane hexagonal geometry a tensile force in any local wire element is transmitted equally into all wires in the net producing exceptional elastic springiness due to tensile elongation. This effect is most pronounced when the individual wires are thin, as is desirable for low pressure drop.

I claim:

1. In an aircraft on the ground, a cowling containing a substantially horizontal duct conveying a propulsive airstream to a turbojet engine, an inlet mouth on said duct, at least one stationary vane attached within said inlet mouth, said vane having a sharp leading edge, said vane having a shape and position such that all of its longitudinal cross sections are substantially straight lines and are aligned substantially parallel to the central axis of said duct, said vane being attached to the wall of said duct in the region of said duct closest to the surface of the ground.

2. In an aircraft on the ground, a cowling containing a substantially horizontal duct conveying a propulsive airstream to a turbojet engine, an inlet mouth on said duct, an anti-vortex vane system attached within said duct, said anti-vortex system comprising a first anti-vortex vane attached within said mouth of said duct and a second anti-vortex vane attached within said mouth of said duct crossing said first anti-vortex vane, both of said vanes being plate-like members with thin leading edges and both being aligned in positions such that all of their longitudinal cross sections lie substantially parallel to the central axis of said duct, the major portion of the sum of the areas of all the vanes of said anti-vortex vane system lying well below the central axis of said duct.

3. In claim 2, the center of the area of said first anti-vortex vane lying closer to the mouth of said duct than the center of the area of said second anti-vortex vane.

4. In an aircraft on the ground, a cowling containing a substantially horizontal duct conveying an airstream to a turbojet engine, an inlet mouth on said duct, an anti-vortex vane system attached within said duct, said anti-vortex vane system comprising multiple stationary vanes having sharp leading edges and sharp trailing edges attached within said inlet mouth, said vanes being aligned with their longitudinal cross sections substantially parallel to the central axis of the duct and the major portion of the sum of the areas of all the vanes of said anti-vortex vane system being located well below the central axis of the duct.

5. In an aircraft on the ground, said aircraft having a substantially horizontal air duct conveying atmospheric air to a turbojet engine, a rigid vane structure mounted within said duct near its mouth, said vane structure having a thin leading edge on the side toward the mouth of said duct and a thin trailing edge on the side away from said mouth, said vane structure having surface area between said leading edge and said trailing edge, said surface area lying along substantially straight lines parallel to the central axis of said duct, said surface area being markedly greater beneath the central axis of said duct than above said central axis.

6. In combination, in an aircraft, a substantially horizontal duct conveying air to a turbojet engine, an anti-vortex vane structure within the mouth of said duct, said vane structure comprising thin, rigid, plate-like vane surfaces aligned with their longitudinal cross sections substantially parallel to the central axis of said duct, the major portion of the sum of the areas of all the vanes in said anti-vortex vane structure being located well below the central axis of said duct, and a thin, resilient, open-meshed net across said duct, said net comprising thin tensile elements between adjacent open meshes, said tensile elements being initially bent, whereby an impact of a foreign object straightens said element and absorbs energy, as described.

7. In the combination as set forth in claim 6, a sheltered cavity in the floor of said duct.

8. In the combination as set forth in claim 7, a closed door-like member in the floor of said sheltered cavity, and means for opening said door-like member externally to the aircraft.

9. In an aircraft, a substantially horizontal intake duct delivering atmospheric air to an engine, an anti-vortex vane structure within said duct, said vane structure comprising thin, rigid, plate-like surfaces, each of said surfaces having a sharp leading edge and a thin trailing edge and a flat contour between leading edge and trailing edge in a direction generally parallel to the central axis of said duct, said vane structure being located in its greater part below the central axis of said duct, a deformable energy-absorbing object-catching sloping net attached across said duct, a sheltered cavity in the wall of said duct adjacent to said sloping net, retraction means retracting said net into said wall at said cavity, door means in the exterior wall of said duct at said cavity, means for opening said door to expel foreign objects overboard from said sheltered cavity, and linkage means interconnecting said net retraction means and said door-opening means, said linkage means opening and closing said door means during retraction of said net.

References Cited in the file of this patent

UNITED STATES PATENTS

| | | |
|---|---|---|
| 2,381,705 | Vokes | Aug. 7, 1945 |
| 2,407,194 | Vokes | Sept. 3, 1946 |
| 2,738,029 | Battle et al. | Mar. 13, 1956 |
| 2,814,454 | Atkins et al. | Nov. 26, 1957 |